United States Patent
Tadokoro

[11] Patent Number: 5,810,446
[45] Date of Patent: Sep. 22, 1998

[54] FRAME STRUCTURE OF SEATBACK

[75] Inventor: Takumi Tadokoro, Machida, Japan

[73] Assignee: Ikeda Bussan Co., Ltd., Ayase, Japan

[21] Appl. No.: 677,938

[22] Filed: Jul. 10, 1996

[30] Foreign Application Priority Data

Jul. 14, 1995 [JP] Japan .................................. 7-201334

[51] Int. Cl.⁶ .................................................. A47C 7/02
[52] U.S. Cl. .............................. 297/452.18; 297/452.2; 297/452.36
[58] Field of Search .......................... 297/452.18, 452.2, 297/452.31, 452.3, 452.34, 452.36; 138/121; 29/91, 91.1

[56] References Cited

U.S. PATENT DOCUMENTS

| | | | |
|---|---|---|---|
| 976,060 | 11/1910 | Fulton | 138/121 |
| 2,695,038 | 11/1954 | Parce et al. | 138/121 |
| 3,604,752 | 9/1971 | Macknick | 297/452.2 |
| 4,695,097 | 9/1987 | Muraishi | 297/452.2 |
| 5,129,707 | 7/1992 | Yamauchi | 297/452.18 |
| 5,131,721 | 7/1992 | Okamoto | 297/452.18 |
| 5,499,863 | 3/1996 | Nakane et al. | 297/452.18 |
| 5,509,716 | 4/1996 | Kolena et al. | 297/452.18 |

FOREIGN PATENT DOCUMENTS

7031526 A1   2/1995   Japan .

*Primary Examiner*—Peter M. Cuomo
*Assistant Examiner*—Anthony D. Barfield
*Attorney, Agent, or Firm*—Foley & Lardner

[57] ABSTRACT

A reversed U-shaped base frame for a seatback frame structure is of a monoblock structure, which includes an upper horizontal tubular portion and two side vertical portions. The two side vertical portions extend downward from axially opposed ends of the upper horizontal tubular portion. The base frame is produced from a shaped metal sheet by pressing and curling the same in such a manner that a given portion of the shaped metal sheet, which is shaped to produce the upper horizontal tubular portion, is curled to have a substantially circular cross section. The feature of the invention is that the curled given portion has circumferentially opposed edges which are overlapped each other.

5 Claims, 3 Drawing Sheets

FRAME STRUCTURE OF SEATBACK

BACKGROUND OF THE INVENTION

1. Field of the Invention

The present invention relates in general to seatbacks of an automotive seat, and more particularly to frame structures of the seatback. More specifically, the present invention is concerned with the seatback frame structures of a type which uses as a main part an integral type frame which is produced from a shaped sheet metal by pressing or stamping the same.

2. Description of the Prior Art

Hitherto, various types of seatback frame structures have been proposed and put into practical use particularly in the field of the automotive seats.

One of such seatback frame structures is shown in Japanese Patent First Provisional Publication 7-31526. That is, the frame structure disclosed by this publication uses an integral type frame which includes an upper horizontal portion and two vertical portions which are integral with the upper horizontal portion and extend downward from axially opposed ends of the same. For mounting a headrest on the seatback frame structure, the upper horizontal portion has two stay holders secured thereto through respective brackets. That is, upon assembly, stays extending from the headrest are held by the stay holders.

However, due to its inherent construction, the seatback frame structure disclosed by the publication fails to have a sufficient stiffness particularly at the upper horizontal portion. Furthermore, in assembling the seatback frame structure, numerous parts are needed and thus troublesome assembling work therefor are needed.

SUMMARY OF THE INVENTION

It is therefore an object of the present invention to provide a seatback frame structure of an automotive seat, which is free of the above-mentioned drawbacks.

According to the present invention, there is provided a seatback frame structure which comprises a base frame of monoblock structure including an upper horizontal tubular portion and two side vertical portions which extend downward from axially opposed ends of the upper horizontal tubular portion, the base frame being produced from a shaped metal sheet by pressing and curling the same in such a manner that a given portion of the shaped metal sheet, which is shaped to produce the upper horizontal tubular portion, is curled to have a substantially circular cross section, wherein the curled given portion has circumferentially opposed edges which are overlapped each other.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
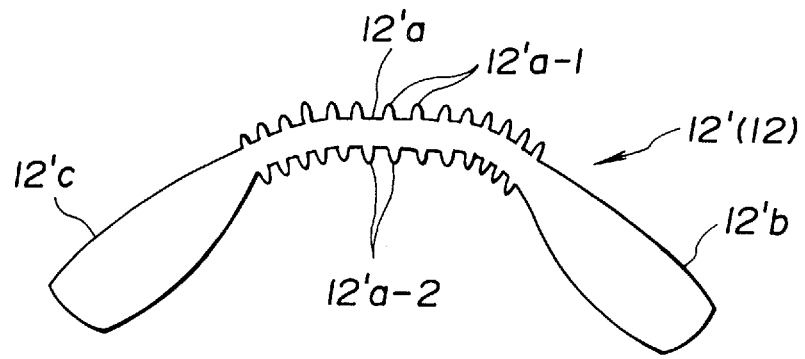
FIG. 1 is a shaped panel member stamped out of a metal sheet, from which a base frame of a seatback frame structure of a first embodiment of the invention is produced.
Figure 2:
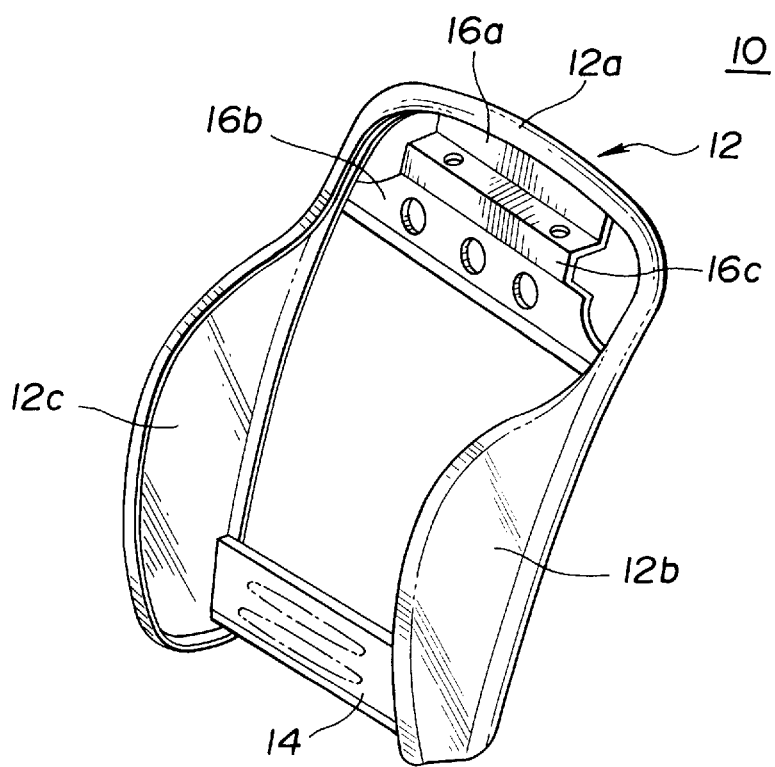
FIG. 2 is a perspective view of the seatback frame structure of the first embodiment in an assembled condition.

Referring to FIGS. 1 to 5 of the drawings, particularly FIG. 2, there is shown a seatback frame structure 10 which is a first embodiment of the present invention.

As shown in FIG. 2, the seatback frame structure 10 comprises a reversed U-shaped base frame 12. That is, the base frame 12 is of a monoblock structure and includes a horizontal upper portion 12a and two vertical side portions 12b and 12c which extend downward from axially opposed ends of the horizontal upper portion 12a.

Although not shown in the drawing, between the vertical side portions 12b and 12c, there extend a plurality of springs. A lumbar supporter (not shown) may be arranged between the side portions 12b and 12c.

As is understood from FIG. 1, the base frame 12 is produced from a shaped panel member 12' which has been stamped out of a metal sheet (not shown). As will become apparent hereinafter, for production of the base frame 12, the shaped panel member 12' is subjected to a curling and pressing process.

With this shaping process, the upper horizontal portion 12a and upper parts of the two vertical side portions 12b and 12c are made tubular, and lower major parts of the two vertical side portions 12b and 12c are shaped flat. More specifically, the flat major part of each side portion 12b or 12c is shaped to have a flange therearound.

Figure 5:
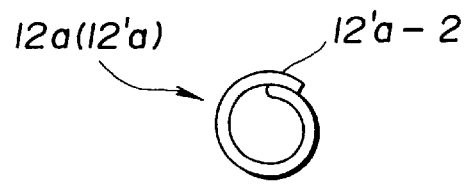
FIG. 5 is a sectional view of the tubular upper horizontal portion of the base frame, which is taken along the line "V—V" of FIG. 6.

FIG. 5 shows a sectional view of the upper horizontal portion 12a of the base frame 12.

Referring back to FIG. 2, a lower panel member 14 is secured at axially opposed ends thereof to rear lower ends of the vertical side portions 12b and 12c of the base frame 12. Welding technique is used for the connection between the lower frame member 14 and the base frame 12.

An upper panel member 16 is secured to an upper part of the base frame 12. That is, the upper panel member 16 is welded to the upper part at its upper and lateral ends, as shown in FIG. 2.

Figure 3:
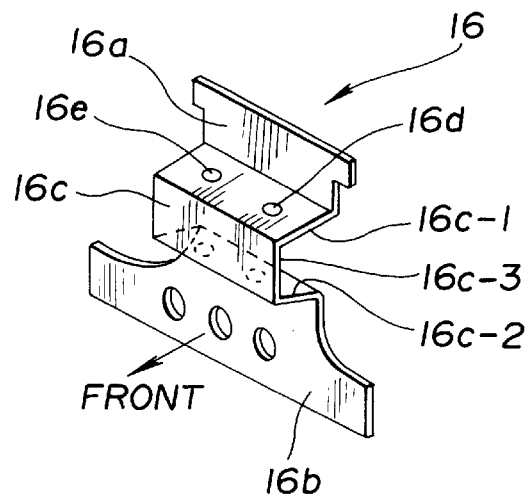
FIG. 3 is a perspective view of an upper panel member employed in the seatback frame structure of the first embodiment.

As is seen from FIG. 3, the upper panel member 16 is of a monoblock structure, which is produced from a sheet metal by pressing or stamping the same. The upper panel member 16 comprises an upper flat vertical portion 16a, a laterally enlarged lower flat vertical portion 16b and a forwardly protruded intermediate portion 16c which is arranged between the upper and lower flat vertical portions 16a and 16b. The intermediate portion 16c serves to mount thereon a stay holder (not shown) for a headrest and comprises upper and lower flat horizontal walls 16c–1 and 16c–2 and a flat vertical wall 16c–3 which extends between front edges of the upper and lower flat horizontal walls 16c–1 and 16c–2. The upper and lower flat horizontal walls 16c–1 and 16c–2 have two pairs of aligned openings 16d and 16e for passing therethrough the stays of the headrest.

Referring back to FIG. 2, in assembly, the upper flat vertical portion 16a of the upper panel member 16 is welded at its upper edge to the horizontal upper portion 12a of the base frame 12, and the lower flat vertical portion 16b of the upper panel member 16 is welded at its lateral ends to the upper tubular parts of the vertical side portions 12b and 12c of the base frame 12. If desired, as shown, the lower flat vertical portion 16b may be provided with openings for reducing the weight of the upper panel member 16.

It is to be noted that the forwardly protruded intermediate portion 16c has such a sufficient stiffness as to assuredly support the headrest stays even when applied with a great stress due to a vehicle collision or the like.

As is mentioned hereinabove, the base frame 12 is produced from a shaped panel member 12' (see FIG. 1) which has been stamped out of a sheet metal. As is seen from this drawing, the shaped panel member 12' has a gently curved structure and comprises generally an intermediate elongate portion 12'a and two side enlarged portions 12'b and 12'c.

The intermediate elongate portion 12'a is the portion for forming the tubular upper horizontal portion 12a and the upper tubular parts of the two vertical side portions 12b and 12c, while the two side enlarged portions 12'b and 12'c are the portions for forming the lower major flat parts of the two vertical side portions 12b and 12c.

As shown in FIG. 1, the intermediate elongate portion 12'a of the shaped panel member 12' is formed along side edges thereof with a plurality of wave-shaped projections 12'a–1 and 12'a–2.

Figure 4:
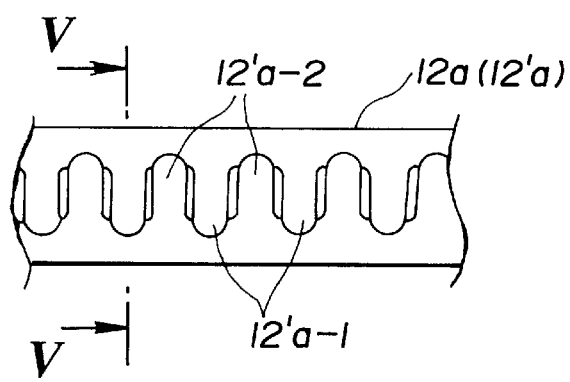
FIG. 4 is a view showing the manner in which laterally opposed ends of a middle part of the shaped panel member of FIG. 1 are engaged to constitute a tubular upper horizontal portion of the base frame of the seatback frame structure.

As is seen from FIGS. 4 and 5, when the shaped panel member 12' is subjected to a curling and pressing process, the intermediate elongate portion 12'a is curled or tubed having the two groups of projections 12'a–1 and 12'a–2 mated to each other. More specifically, upon completion of this shaping process, the projections 12'a–1 or 12'a–2 of one group are engaged with recesses defined between the projections 12'a–2 or 12'a–1 of the other group. Of course, the width of each projection 12'a–1 or 12'a–2 is smaller than the width of the corresponding recess, as shown. If desired, the complementary pairs of the projections and recesses may be welded for increasing a mechanical strength of the tubular upper portion 12a of the base frame 12.

Figure 6:
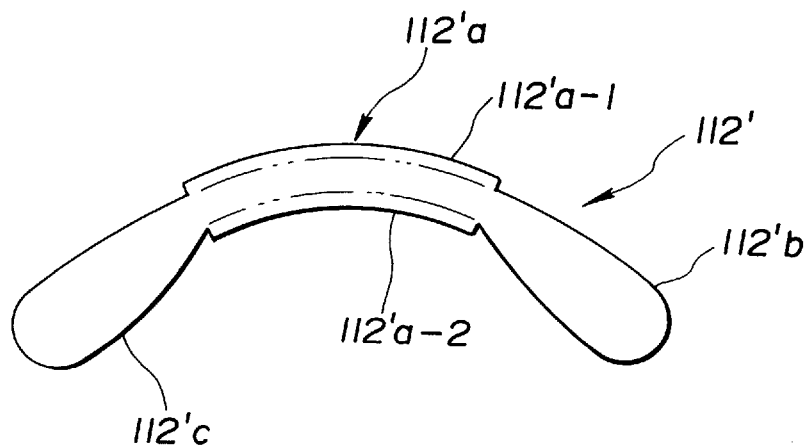
FIG. 6 is a view similar to FIG. 1, but showing a second embodiment of the present invention.
Figure 7:
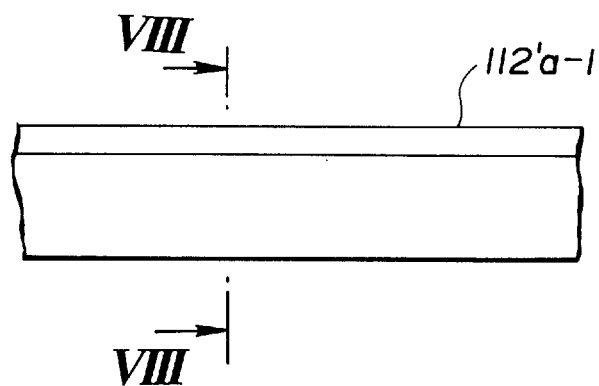
FIG. 7 is a view similar to FIG. 4, but showing the second embodiment.
Figure 8:
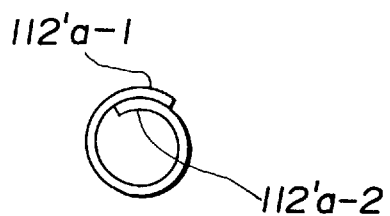
FIG. 8 is a view similar to FIG. 5, but showing the second embodiment, which is taken along the line "VIII—VIII" of FIG. 7.

Referring to FIGS. 6 to 8, there is shown a base frame employed in a second embodiment of the present invention.

In FIG. 6, there is shown a shaped panel member 112' from which a reversed U-shaped base frame similar to the base frame 12 of the first embodiment is produced. Similar to the case of the first embodiment, the shaped panel member 112' is subjected to a curling and pressing process for producing the base frame.

The shaped panel member 112' has a gently curved structure and comprises generally an intermediate elongate portion 112'a and two side enlarged portions 112'b and 112'c.

The intermediate elongate portion 112'a is formed along side edges thereof with respective flanges 112'a–1 and 112'a–2.

As is seen from FIGS. 7 and 8, when the shaped panel member 112' is subjected to the curling and pressing process, the intermediate elongate portion 112'a is curled or tubed having the flanges 112'a–1 and 112'a–2 overlapped each other. That is, upon completion of the shaping process, one flange 112'a–1 is put on the other flange 112'a–2, as is well seen from FIG. 8. If desired, these overlapped flanges 112'a–1 and 112'a–2 may be welded for increasing the mechanical strength of the base member.

In the following, modifications of the present invention will be described.

First, in the first embodiment (see FIG. 1), the wave-shaped projections 12'a–1 or 12'a–2 may be formed on only one side edge of the intermediate elongate portion 12'a. Of course, in this case, the projections are placed on the opposed edge side upon completion of the shaping process. Like this, in the second embodiment (see FIG. 6), one of the flanges 112'a–1 or 112'a–2 may be removed.

Second, in the first embodiment (see FIG. 4), the projections 12'a–1 of one group may be mated with the projections 12'a–2 of the other group.

What is claimed is:

1. A seatback frame structure comprising:
a base frame of monoblock structure including an upper horizontal tubular portion and two side vertical portions which extend downward from axially opposed ends of said upper horizontal tubular portion, said base frame being produced from a shaped metal sheet by pressing and curling the same in such a manner that a given portion of the shaped metal sheet, which is shaped to produce said upper horizontal tubular portion, is curled to have a substantially circular cross section, the curled given portion having circumferentially opposed edges which overlap each other;
a lower panel member secured at laterally opposed ends to the side vertical portions of the base frame; and
an upper panel member secured at its upper portion to the upper horizontal tubular portion of the base frame, and at it's laterally opposed ends to the side vertical portions of the base frame;
wherein the upper panel member is of a monoblock structure produced by pressing a metal sheet, the upper panel member including:
an upper flat vertical portion having an upper edge welded to the upper horizontal tubular portion of the base frame;
a lower flat vertical portion having laterally opposed ends welded to the side vertical portions of the base frame; and
a forwardly protruding intermediate portion arranged between the upper flat vertical portion and the lower flat vertical portion, the intermediate portion being formed with aligned openings for receiving stays of a headrest.

2. A seatback frame structure as claimed in claim 1, in which said opposed edges are formed with first and second groups of wave-shaped projections respectively, the projections of the first group being mated to those of the second group.

3. A seatback frame structure as claimed in claim 2, in which the projections of the first group are engaged with recesses defined between the projections of the second group.

4. A seatback frame structure as claimed in claim 1, in which the overlapped opposed edges of said curled given portion are welded.

5. A seatback frame structure as claimed in claim 1, in which one of said opposed edges is formed with wave-shaped projections, said projections being put on the other edge.

* * * * *